Patented Aug. 13, 1929.

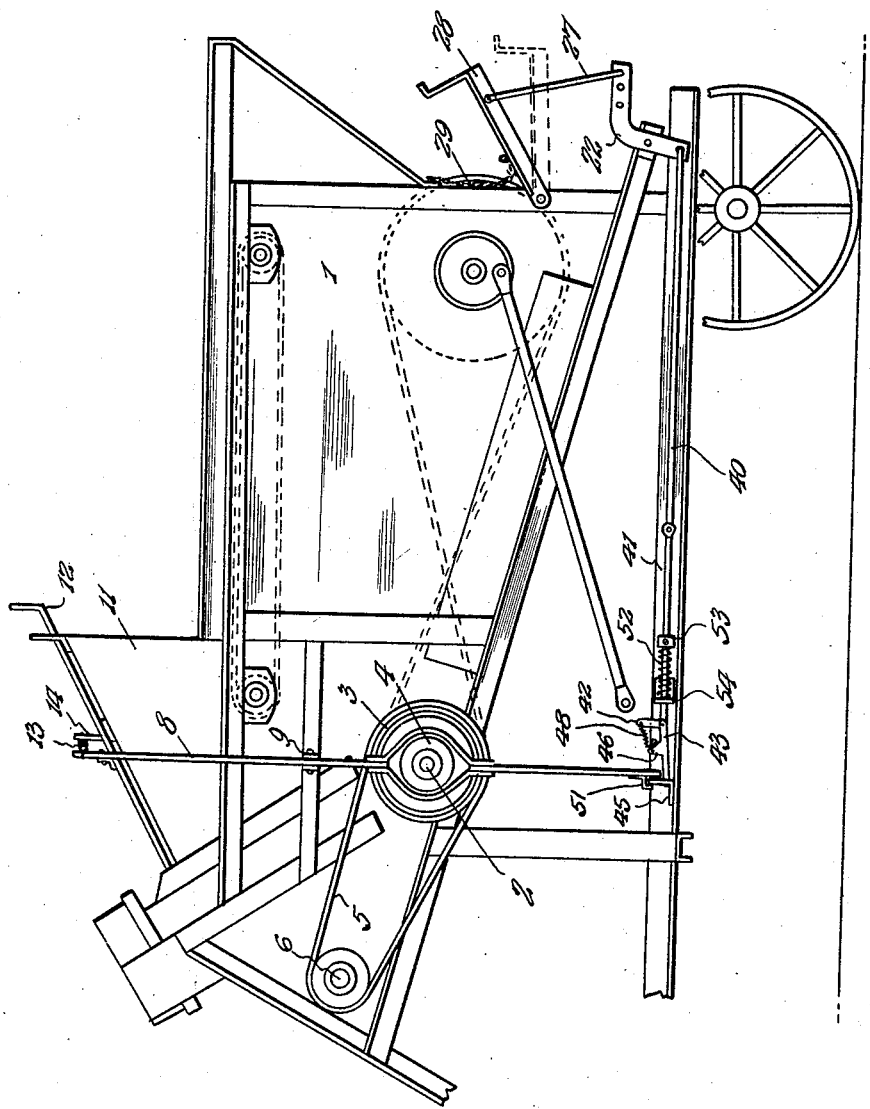

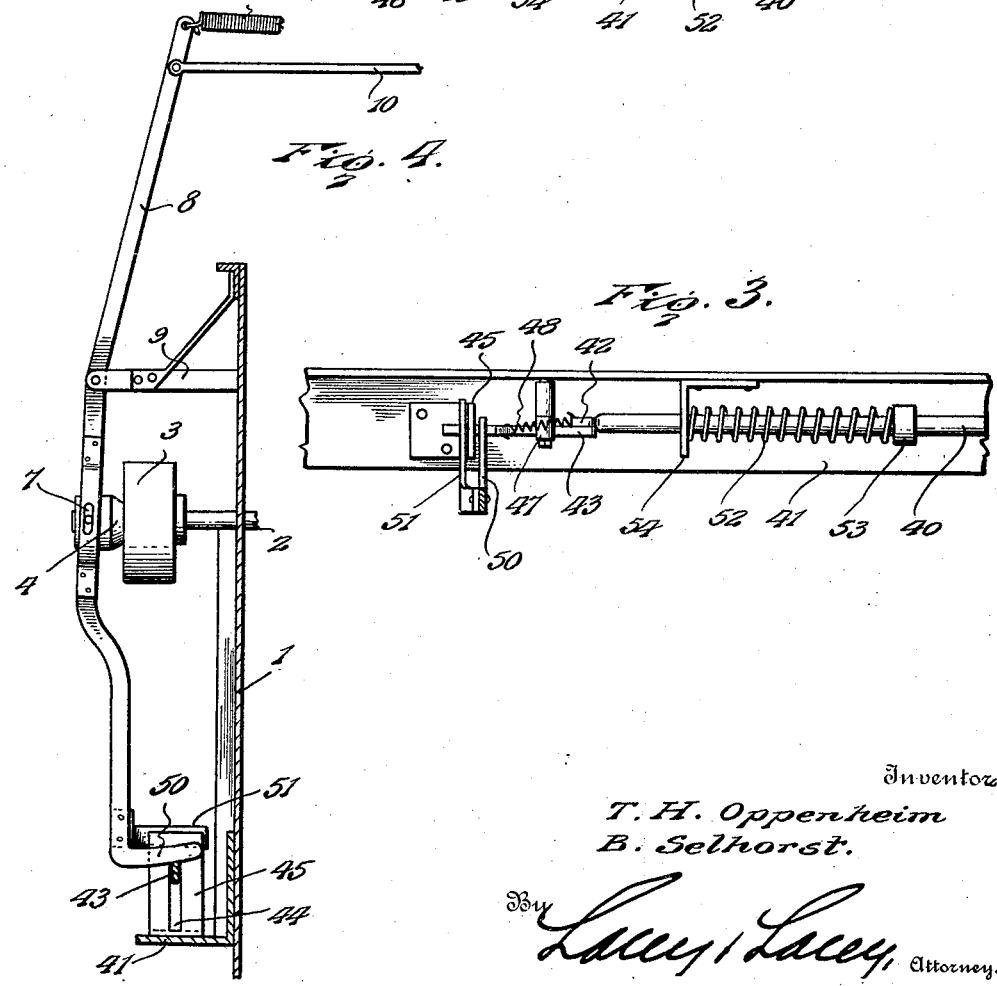

1,724,614

UNITED STATES PATENT OFFICE.

THEODORE H. OPPENHEIM AND BERNARD SELHORST, OF COLDWATER, OHIO, ASSIGNORS TO THE NEW IDEA SPREADER CO., OF COLDWATER, OHIO, A CORPORATION OF OHIO.

SAFETY DEVICE.

Original application filed September 14, 1927, Serial No. 219,502. Divided and this application filed June 23, 1928. Serial No. 287,857.

This invention is a safety device by the use of which machinery will be automatically stopped when the operator leaves his position, the present application being a division of an application filed by us September 14, 1927, Serial No. 219,502.

In the accompanying drawings:

Figure 1 is a side elevation of a cornhusking machine having the invention applied thereto;

Fig. 2 is an enlarged side elevation of the lower end of the clutch-controlling lever and the parts immediately associated therewith;

Fig. 3 is a horizontal section on the line 3—3 of Fig. 2, and

Fig. 4 is a vertical transverse section on the line 4—4 of Fig. 2.

The husking machine 1 may be of any desired form and includes a shaft 2 which drives some of the working elements and is equipped with a loose pulley 3 with which cooperates a clutch cone 4 whereby the pulley may be locked to the shaft. A band 5 is trained around the pulley and transmits motion thereto from a main driving shaft 6. Carrying the cone clutch member 4 and having a pin and slot connection therewith, as shown at 7, is a controlling lever 8 which is fulcrumed upon a bracket 9 above the pulley and extends above and below the same, as clearly shown in Figs. 1 and 4. To the upper end of the lever 8 is attached a rod 10 which extends across the hopper, indicated at 11, and is connected at its inner end with a hand lever 12 projecting forwardly over the hopper, as will be understood, so that by shifting the hand lever in an obvious manner the clutch-controlling lever will be rocked to close or open the clutch. A retractile spring 13 is also attached to the upper extremity of the clutch-controlling lever and to a bracket or other fixed member upon the hopper, as indicated at 14.

A trip or locking rod 40 is disposed alongside the frame bar 41 of the machine and the front end of said rod is pivoted to the lower depending arm of an angle lever 22 mounted upon the frame at the front end thereof, the upper arm of said lever projecting forwardly and having the lower end of a link 27 pivoted thereto. Hinged to the frame above the angle lever is a platform 28 upon which the operator stands when the machine is working, and the upper end of the link 27 is pivoted to the platform.

The rear end of the rod 40 is upturned to define a finger 42 at the base of which a latch 43 is pivoted. The latch projects rearwardly through a vertical slot 44 in a latch guide 45, secured on the frame bar, whereby the latch is held to a rectilinear path, and on the upper edge of the latch is a cam projection 46 arranged to engage a projection 47, preferably an idle roller, on the frame. A spring 48 is attached to and extends between the cam and the finger 42, and it will be seen at once that when the rod 40 moves forward, as the operator leaves the platform, the cam will be drawn against the projection and the latch lowered while upon reverse movement of the rod the latch will be raised through the influence of the spring. The clutch-controlling lever is provided at its lower end with an eccentric locking arm 50 arranged to project over the latch alongside of the latch guide, as shown in Figs. 3 and 4, whereby the lever will be held in clutch-closed position. A lever-guiding bracket 51 is secured to the lever near the lower end thereof and projects laterally to play at the opposite side of the latch guide and thereby maintain the lever in operative position. When the clutch is closed, the parts will be in the positions shown in Fig. 2 and the latch will prevent downward movement of the keeper or locking arm 50 but when the platform is relieved of the operator's weight and the rod 40 moves forward, the ensuing depression of the latch permits said arm 50 to swing downward and the lever moves to clutch-opening position under the influence of the spring 13. An expansion spring 52 is coiled around the rod 40 between an abutment 53 thereon and a bracket 54 secured on the frame bar 41 and by which the rod is guided and supported, said spring tending constantly to move the rod forward and raise the platform.

Assuming the machine to be in operation, the platform 28 will be in the lowered position shown by dotted lines in Fig. 1, and, to prevent the platform dropping below said position, a chain or other restraining device, indicated at 29, may be provided and attached at one end to the platform and at the other end to the machine frame. When the platform is lowered, the angle lever 22 will be rocked so that the rod 40 is pushed rearwardly. When the operator initially takes his position upon the platform, the clutch will be open and the lower end of the controlling lever 8 will be at the outer limit of its movement. After assuming his position upon the platform, the operator shifts the hand lever 12 so that the controlling lever 8 will be rocked to throw the clutch in and this movement of the controlling lever will, of course, carry the eccentric arm 50 inwardly, the lower edge of the same riding over the latch to be held up thereby. Should the operator leave the platform, the spring 52 will immediately expand so as to withdraw the latch which will be depressed as it rides against the roller 47, and the spring 13 will then at once contract so as to rock the clutch-controlling lever 8 and open the clutch, the machinery being thus automatically stopped whenever the operator may leave the platform. When the operator resumes his position upon the platform, the clutch will remain open inasmuch as the spring 13 will be contracted and the clutch will not be closed until the operator shifts the hand lever 12 to throw the clutch in.

From the foregoing description, taken in connection with the accompanying drawings, it will be seen that we have provided an exceedingly simple, compact and inexpensive mechanism which may be readily applied to any machine and by which the working elements will be automatcally and instantly stopped whenever the operator leaves his position, and they will remain inoperative until after the operator has resumed his position and manually throws in the clutch.

Having thus described the invention, we claim:

1. The combination with a clutch-controlling lever, means yieldably holding the lever in clutch-opened position and an element normally inactive and movable to active position by human effort, of a latch connected with said element and engageable with the lever to hold the clutch closed when the element is in active position, a cam on the latch, a fixed projection in the path of the cam, and yieldable means holding the cam to said projection whereby when the element moves to inactive position the lever will be released to open the clutch.

2. The combination of a supporting frame, a clutch-controlling lever fulcrumed on the frame, a guide on the frame adjacent the lower end of the lever, a bracket on the lever engaged with said guide, a normally inactive element on the frame at the operator's position, said element being movable to active position by human effort, a latch mechanism controlled by said element and working through said guide to hold the clutch-controlling lever in clutch-closing position when the element is in active position, means for manually shifting the lever to clutch-closing position, and means for moving the lever to clutch-opening position whenever the latch mechanism and said element are in inactive position.

3. The combination of a supporting frame, a clutch-controlling lever mounted on the frame, an eccentric locking arm on the lower end of the lever, an element mounted on the frame and normally in inactive position and movable to active position by human effort, a latch connected with said element and engaging the locking arm in angular relation thereto, means for shifting the lever to clutch-closing position, means for automatically shifting the lever to clutch-opening position, and means for rocking the latch whereby as said movable element is shifted the lever will be locked in clutch-closing position when said element is in active position and the clutch will be released as the element moves to inactive position.

In testimony whereof we affix our signatures.

THEODORE H. OPPENHEIM. [L. S.]
BERNARD SELHORST. [L. S.]